Patented Feb. 19, 1952

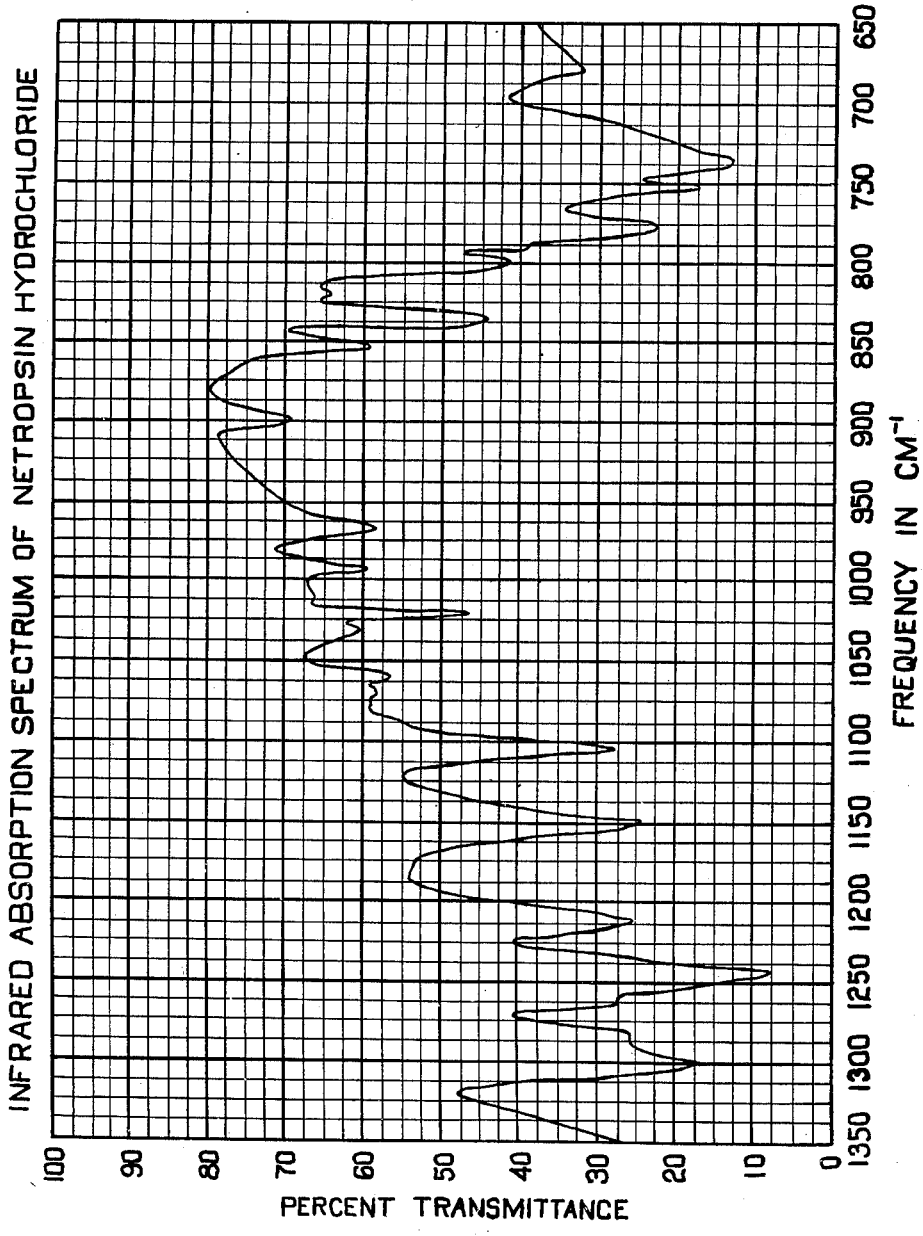

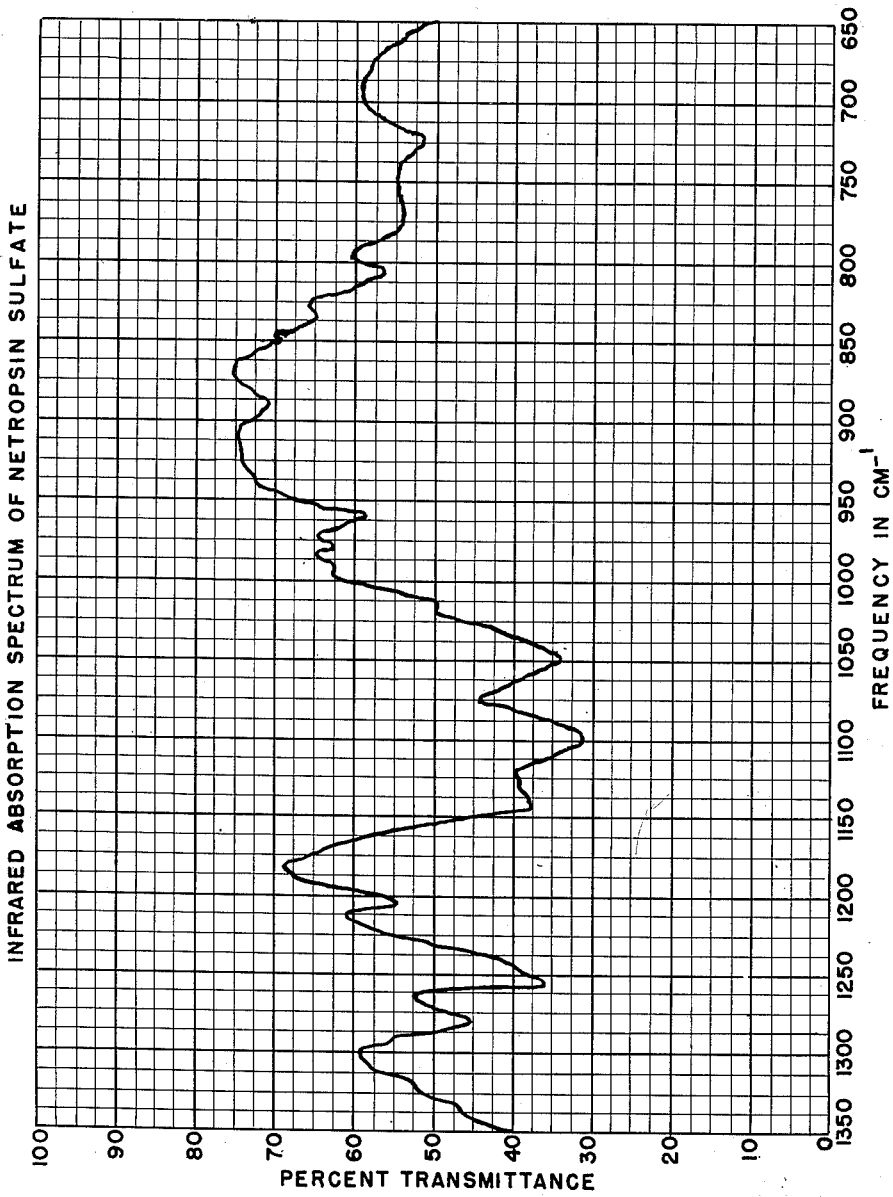

2,586,762

UNITED STATES PATENT OFFICE 2,586,762

NETROPSIN AND PROCESS FOR ITS PRODUCTION

Alexander C. Finlay, Long Island City, and Ben A. Sobin, New York, N. Y., assignors to Chas. Pfizer & Co., Inc., Brooklyn, N. Y., a corporation of Delaware Application August 25, 1949, Serial No. 112,411

8 Claims. (Cl. 167—65)

This invention is concerned with a new and useful antibiotic substance, Netropsin, and a process for preparing the same by the cultivation under particular controlled conditions of certain strains of a micro-organism hitherto undescribed, called Streptomyces netropsis. This organism was isolated from a sample of soil taken near Hudson, New York, and its description, following the key of Bergey's "Manual of Determinative Bacteriology," sixth edition, pages 929–933 follows:

The cultural characteristics of this new species, based on our isolate number 2937-6, are given below in tabular form. A living culture of said isolate has been deposited with the Fermentation Division of the Northern Regional Research Laboratory at Peoria, Illinois, and has been added to its permanent collection of microorganisms as NRRL–2268. The colors, where R is written, are those of Ridgway, Color Standards and Nomenclature.

| Medium | Amount of Growth | Color | |
|---|---|---|---|
| | | Aerial Mycelium and Spores | Soluble Pigment |
| Glucose asparagine. | Moderate. | White aerial mycelium; no spores. | Brown. |

Other Remarks.—Colonies slightly elevated; edge smooth; surface rough, slightly wrinkled; reverse brown; whorls or terminal clusters of short, stiff hyphae on tips of short hyphae (synthetic agar). Conidia borne in chains, gram-variable, approximately 0.65 x 1.30µ, short cylindrical (conidial data from synthetic agar tubes). Colonies plated out all were similar; most of colony was White with some Light Mouse Gray and Cream Buff (R); reverse from Ivory Yellow to Honey Yellow (R).

| Gelatin | Moderate. | White aerial mycelium. | Dark brown. |
|---|---|---|---|

Other Remarks.—No liquefaction. Reverse brown.

| Litmus milk | Very poor. | | None. |
|---|---|---|---|

Other Remarks.—pH unchanged. No peptonization or hydrolysis.

| Ca malate | Poor to moderate. | White aerial mycelium. | None. |
|---|---|---|---|

Other Remarks.—Reverse Cream Buff (R).

| Glucose agar | Good. | White aerial mycelium. | Brown. |
|---|---|---|---|

Other Remarks.—Reverse dark brown.

| Potato | Poor. | Buffy Brown (R); no aerial mycelium, waxy, wrinkled. | Medium to dark brown. |
|---|---|---|---|
| Starch plates | Moderate, thin. | White aerial mycelium. | None. |

Other Remarks.—Reverse Pale Olive Buff (R). Starch strongly hydrolyzed.

| Medium | Amount of Growth | Color | |
|---|---|---|---|
| | | Aerial Mycelium and Spores | Soluble Pigment |
| Synthetic agar | Poor, thin. | Pale Vinaceous Fawn (R) sporulation. | None. |

Other Remarks.—Reverse Pale Olive Buff (R).

| Nutrient agar | Moderate to good. | White aerial mycelium. | Light brown. |
|---|---|---|---|

Other Remarks.—Reverse light brown.

| Emerson's | Good. | White aerial mycelium. | Light brown. |
|---|---|---|---|

Other Remarks.—Reverse light brown.

| Nitrate broth | Good. | | Brown. |
|---|---|---|---|

Other Remarks.—Nitrates not reduced.

It is to be understood that for the production of Netropsin we are not limited to this particular organism or organisms obtained from this particular sample of soil or to organisms fully answering the above description which is given merely for illustrative purposes. In particular this invention includes the use of organisms which are mutants produced from the described organism by mutating agents such as X-radiation, ultra-violet radiation, nitrogen mustards, etc.

Antibiotics produced by organisms of a genus Streptomyces of the Actinomycetes of which a number are now well known fall into two classes, (1) neutral substances extractable from broths at acid, neutral and alkaline pH by solvents and (2) basic substances in general not extractable by organic solvents. Chloromycetin and Actinomycin are typical of the first group and Streptomycin and Streptothricin of the second. By this criterion, Netropsin is a member of the second group. Netropsin also shares with this group the property of being precipitated by certain acid dyestuffs such as, Erio Chrome Violet, Naphthol Blue Black, Orange II and other similar sulfonic acid dyes. This second group is characterized by a wide antibiotic spectrum, particularly among the Gram-negative bacteria. The following table shows the comparative spectra of Streptomycin, Streptothricin, Chloromycetin, Aureomycin and Netropsin.

TABLE I

*Mcg. per ml. of antibiotic necessary to inhibit growth of micro-organisms on nutrient agar plates*

| Organism | Aureomycin [1] | Chloromycetin [2] | Streptomycin [3] | Streptothricin [4] | Netropsin [5] |
|---|---|---|---|---|---|
| S. aureus | 0.9 | 7 | 4 | 6 | 5 |
| S. albus | 0.9 | 7 | 6 | 5 | 3 |
| B. subtilis | 1 | 5 | 5 | 30 | 5 |
| B. mycoides | 0.9 | 5 | 7 | 70 | 20 |
| Bodenheimer Org | 1 | 500 | >1,000 | 10 | 30 |
| S. typhosa | 5 | 4 | 10 | 10 | 10 |
| S. pullorum | 2 | 5 | 30 | 5 | 8 |
| S. paratyphi A | 5 | 5 | 20 | 5 | 20 |
| S. paratyphi B | 5 | 5 | 30 | 10 | 10 |
| K. pneumoniae | 7 | 5 | 10 | 5 | 10 |
| Sh. paradysenteriae | 5 | 1 | 10 | 7 | 7 |
| E. coli | 5 | 5 | 5 | 7 | 7 |
| A. aerogenes | 0.9 | 2 | 5 | 5 | 5 |
| Ps. aeruginosa | 10 | 20 | 10 | 10 | 1,000 |
| Proteus sp | 50 | 80 | 10 | 8 | 40 |
| M. albicans | 2,000 | >2,000 | >2,000 | 100 | 90 |

[1] Crystalline hydrochloride.
[2] Crystalline.
[3] Streptomycin sulfate (750 streptomycin units/mg.) expressed as mcg. active base.
[4] Streptothricin sulfate (ex-crystalline helianthate, 800 streptomycin units/ mg.).
[5] Crystalline Netropsin hydrochloride.

Another method of distinguishing Netropsin from known antibiotics produced by species of Streptomyces is by the action of antibiotics on strains of bacteria made resistant to the various antibiotics.

In all cases the dosage has been reduced to E. coli dilution units per milligram. By E. coli dilution units (CDU) per milligram, we mean the volume of nutrient broth in milliliters to which one milligram of the antibiotic preparation (which may be of varying degrees of purity) may be diluted, when inoculated with a $10^{-6}$ dilution of an 18 hour culture of E. coli grown under the same conditions and at the end of 18 hours' incubation at 37° C., shows no growth.

In Table II it may be seen that Netropsin is able to restrain the growth of strains of A. aerogenes made resistant to Streptomycin, Streptothricin, and Chloromycetin. This clearly distinguishes Netropsin from these antibiotics.

TABLE II

*Comparison of action of various antibiotics against strains of A. aerogenes in nutrient broth*

| Organism | Aureomycin 50 (CDU/ml.) | 100 | Streptomycin 50 (CDU/ml.) | 100 | Streptothricin 50 (CDU/ml.) | 100 | Chloromycetin 50 (CDU/ml.) | 100 | Netropsin 50 (CDU/ml.) | 100 |
|---|---|---|---|---|---|---|---|---|---|---|
| A. aerogenes strain A | − | − | − | − | − | − | − | − | − | − |
| A. aerogenes strain B | − | − | − | − | − | − | + | + | − | − |
| A. aerogenes strain C | − | − | + | + | − | − | − | − | − | − |
| A. aerogenes strain D | − | − | + | + | + | + | − | − | − | − |

+ = growth.  − = no growth.
A. aerogenes strain A is sensitive to 25 CDU/ml. of all antibiotics.
A. aerogenes strain B is resistant to 200 CDU/ml. of chloromycetin.
A. aerogenes strain C is resistant to 4400 CDU/ml. of streptomycin and ca. 25 CDU/ml. of streptothricin.
A. aerogenes strain D is resistant to 7500 CDU/ml. of streptothricin and ca. 200 CDU/ml. of streptomycin.

The toxicity of various antibiotics including Netropsin is given in Table III.

TABLE III

*Toxicity of various antibiotics*

[Mg. per 20 g. Mouse.]

| Antibiotic | Intravenous LD$_0$ | Intravenous LD$_{50}$ | Subcutaneous LD$_0$ | Subcutaneous LD$_{50}$ | Oral LD$_0$ | Oral LD$_{50}$ |
|---|---|---|---|---|---|---|
| Streptomycin sulfate | 2.5 | | | | | |
| Streptothricin sulfate | 4.0 | | | | | |
| Chloromycetin | 0.6 | | | | | |
| Aureomycin hydrochloride | 1.5 | | | | | |
| Netropsin | 0.2 | 0.34 | 0.6 | 1.4 | 6 | 76 |

Netropsin is advisably isolated in the form of its salts, preferably the sulfate or the hydrochloride. An examination of Netropsin hydrochloride indicates the following characteristics. Upon drying at 100° C. for 5 hours there is a loss in weight of about 7.8% and loss of crystallinity without loss in antibacterial activity. The dried material gave the following elementary analysis.

C _____ Per cent__ 42.9
H _____ do____ 5.78
N _____ do____ 28.1
Cl (ionic) _____ do____ 13.7
Cl (total) _____ do____ 13.7
$[\alpha]_D = 0$ (1% in H$_2$O, 23° C.)

The anhydrous, hygroscopic Netropsin hydrochloride melts with decomposition at 168–172° C., when placed in a bath at 160° C. with the temperature rising 2° C. per minute. It shows no optical activity in water, methanol or dimethylformamide solutions. The ultraviolet absorption spectrum of an aqueous solution shows the following maxima:

$E_{1\,cm.}^{1\%}$     295 m$\mu$ = 423

$E_{1\,cm.}^{1\%}$     238 m$\mu$ = 430

A mineral oil mull of the anhydrous Netropsin hydrochloride shows many characteristic absorption maxima in the infrared region. Among these are the following frequencies (in reciprocal centimeters): 3525, 3300, 3170, 1703, 1670, 1583, 1518, 1300, 1244, 1211, 1149, 1104, 1068, 1060, 1031, 1021, 993, 967, 898, 852, 835, 818, 798, 778, 751, 734, 679. The infrared absorption spectrum of this mineral oil mull within the characteristic region of wave numbers between 1350 and 650 cm.$^{-1}$ is shown in Fig. 1 of the accompanying drawings.

Before drying the crystals of Netropsin hydrochloride are long, thin, colorless, hydrated prisms which exhibit oblique extinction.

The stability of Netropsin hydrochloride in water at 500 mcg./ml. when boiled for fifteen minutes is as follows:

| pH | Per Cent Loss in Activity |
|---|---|
| 2.0 | 0 |
| 5.8 | 0 |
| 9.0 | 50 |

When Netropsin hydrochloride is dissolved in an equivalent quantity of 0.2 N sodium hydroxide, inactivation is complete in less than two hours at 25° C.

Netropsin sulfate is somewhat more satisfactory from a manipulative standpoint than the hydrochloride. It may be prepared by the addition of 0.65 g. of potassium sulfate in 10 ml. of water to 1.0 g. of Netropsin hydrochloride in 75 ml. of boiling water. On cooling, the hydrated sulfate is recovered as long, colorless needles in a virtually quantitative yield. A recrystallized sample, dried at 100° C. and 0.02 mm. Hg pressure for six hours showed no loss in biological activity. This salt melts at 224–5° C. when placed in a bath at 220° C., with the temperature rising 2° C. per minute. It has a solubility of about 30 mg./ml. in water at 80° C. and less than 0.5 mg./ml. at 25° C. It is quite insoluble in the common organic solvents.

The ultraviolet absorption spectrum of an aqueous solution of the sulfate at pH 5.5 exhibits two peaks:

$E_{1\,cm.}^{1\%}$ at 236 m$\mu$ = 429

$E_{1\,cm.}^{1\%}$ at 296 m$\mu$ = 436

The infrared absorption spectrum of a mineral oil mull of hydrated Netropsin sulfate exhibits the broad maxima characteristic of large molecules at approximately the following wave lengths: 3290, 1580, 1260, 1145, 1100, 1050, 990, 960, 890, 850, 830 and 805 cm.$^{-1}$. In addition, there are certain, somewhat sharper peaks at approximately the following wave lengths: 1660, 1630, 1400, 1285 and 1210 cm.$^{-1}$. The characteristic portion of this infrared absorption spectrum within the range of from 1350 to 650 cm.$^{-1}$ is shown in Fig. 2 of the drawings.

The free base of Netropsin is difficult to isolate owing to its instability. The analyses and molecular weights of its salts indicate it to be a tetra-acidic base, probably corresponding to the formula: $C_{32}H_{48}N_{18}O_4$. It is relatively stable in acid solution, having a half life of about two hours in 1 N sulfuric acid at 100° C.

The behavior of several antibiotics on a paper chromatogram in a system of water saturated with n-butanol containing 2% p-toluenesulfonic acid run for 24 hours at 23° C. was compared using B. subtilis as the test organism.

| Antibiotic | Rf |
|---|---|
| Streptomycin A | 0.24 |
| Streptothricin | 0.025 |
| Netropsin | 0.28 |

Netropsin and its salts have not yet been demonstrated to be useful in human therapy. However, it has been demonstrated that the Netropsin hydrochloride is highly effective for protecting wool fabrics against attack by clothes moth larvae.

This invention embraces the process for growing a new and hitherto undescribed micro-organism at 24–30° C. under submerged conditions of agitation and aeration on media consisting of a carbohydrate source, such as sugars, starch, glycerol; an organic nitrogen source, such as soybean meal or wheat gluten; a source of growth substances, such as distillers' solubles; common salt and calcium carbonate as a buffering agent, separating the mycelium after growth has been completed, precipitating the antibiotic out of the broth by the addition of sulfonic acid dyestuffs, such as Erio Chrome Violet, Naphthol Blue Black, Orange II at a specified pH, decomposing the dye cake and removing the antibiotic from the filtrate. The invention is not limited, however, to any specific method of antibiotic recovery. The new antibiotic, Netropsin, produced as aforesaid, possesses unique and valuable properties which differentiate it from all known and previously described antibiotics.

Inoculum is obtained by employing a growth from slants or Roux bottles inoculated with Streptomyces netropsis. A solid medium suitable for this initial growth is:

| | G. |
|---|---|
| Dextrose | 10 |
| Beef extract | 4 |
| Peptone | 4 |
| Yeast extract | 1 |
| Sodium chloride | 2.5 |

Distilled water to 1000 ml.; adjust pH to 7.0 and add—

| | |
|---|---|
| Agar | 30 |

This growth is used to inoculate either shaken flasks or submerged inoculum tanks; or alternatively the inoculum tanks are inoculated from the shaken flasks. In shaken flasks growth will generally have reached its maximum in 4 days, whereas inoculum in submerged inoculum tanks will usually be at the most favorable period in two days. From the inoculum tank the broth mixed with the micro-organism is forced into the fermenter under completely sterile conditions and growth is continued for a further period of 2 days. At all times aeration is maintained in tanks by blowing in sterile air through a sparger at the rate of ½–2 volumes of free air per volume of broth per minute. While the broth is agitated at a speed depending upon the type of agitator, complete sterility is maintained at all times and the temperature of the broth is maintained between 24° C. and 30° C.

The invention may be more readily understood by a consideration of the following illustrative examples.

EXAMPLE I

Medium:

| | G. |
|---|---|
| Wheat gluten | 10 |
| Glycerol | 10 |
| Distillers' solubles | 0.5 |
| Sodium chloride | 5 |

Tap water to 1000 ml.; pH adjusted to 7.0 with KOH then add—

| | |
|---|---|
| Calcium carbonate | 1 |

The medium is distributed 500 ml. to 2.8 liter Fernbach flask, sterilized for 30 minutes at 121° C. After cooling, the medium is inoculated with a suspension of Streptomyces netropsis. The flasks are shaken on a rotary shaker having a displacement of 2½", at 200 R. P. M., at 27° C., for 4 days. At that time, it was found that the broth had a potency of 320 CDU/ml.

Thirteen liters of a mixture of broth and mycelium was adjusted to pH 2.0 with H₃PO₄, a small amount of Super-cel (a commercial filter aid) was added and the mixture filtered. The clear filtrate which had been separated from the mycelium was adjusted to pH 6.5 with NaOH and 39 grams of ammonium oxalate was stirred in and the precipitate of calcium oxalate removed by filtration. The broth was adjusted to pH 5.5 with HCl and 26 grams of Orange II was added with stirring, which was continued for one hour. The dye precipitate was filtered off with the aid of Super-cel, and washed with 2 liters of distilled water. The air-dried cake was suspended in 2 liters of a mixture of 20% methanol and 80% acetone and decomposed by stirring for 1½ hours after the addition of 200 ml. of a 50% methanolic solution of triethylamine sulfate. After filtration, the cake containing Super-cel and the antibiotic sulfate was washed with sufficient acetone and methanol to remove all traces of dye and excess triethylamine sulfate. The cake was extracted with cold, distilled water and the antibiotic sulfate solution filtered free from the Super-cel. The resulting solution of Netropsin sulfate was dried and found to have a potency of 485 Streptomycin units/mg. and 745 CDU/mg.

EXAMPLE II

Medium:
  Wheat gluten_____g__ 10
  Glycerol _____g__ 10
  Distillers' solubles_____g__ 5
  Sodium chloride_____g__ 5
  Tap water to 1 liter; adjust to pH 7.0 with KOH and add—
  Calcium carbonate_____g__ 1
  Soybean oil_____ml__ 1
  Sterilize 45 minutes at 121° C.

Twenty gallons of the above medium in 50-gallon stirred inoculum tanks were inoculated from a slant of Streptomyces netropsis and grown for 56 hours at 27° C. with constant agitation at 1800 R. P. M. while sterile air was blown through the broth at about one volume of free air per volume of broth per minute. At the end of 56 hours the inoculum prepared as above was transferred under completely sterile conditions to 150 gallons of the same medium in a 250-gallon fermenter. Agitation and aeration were the same as in the inoculum tank and at the end of 48 hours at 27° C. the broth was found to have a final potency of 320 CDU/ml.

One hundred and fifty gallons of broth so prepared was adjusted to pH 2.0 with sulfuric acid; Super-cel was added and the broth separated from the mycelium by filtration. The clear broth was brought to pH 5.5 with KOH and calcium oxalate, removed by treatment with ammonium oxalate. The calcium oxalate was removed by filtration and Orange II was added at the rate of 2 grams per liter and stirred for one hour. The dye precipitate was filtered off with the aid of Super-cel and washed with 30 gallons of distilled water. The dye cake was suspended in 20 gallons of a mixture of 80% acetone and 20% methanol and 250 ml. of triethylamine sulfate was added. After stirring for 1½ hours the Netropsin sulfate and Super-cel were separated by filtration and the cake washed with 5 gallons of the above mixed solvents. The cake was suspended in 15 liters of water and 120 grams of BaCl₂.2H₂O was added to convert the Netropsin sulfate to the hydrochloride. The solution of Netropsin hydrochloride was filtered free from Super-cel and barium sulfate, adjusted to pH 2.0 with H₂SO₄ which caused the precipitation of excess barium ion as barium sulfate. Excess sulfate ion was removed by stirring with IR-4 (an ion exchange resin sold by the Resinous Products Company) until the pH was 5.5. The Netropsin hydrochloride solution was filtered free from the barium sulfate and the IR-4 resin and dried. The amorphous Netropsin hydrochloride showed a potency of 380 Streptomycin units/mg. and 640 CDU/mg. The amorphous Netropsin hydrochloride was dissolved in distilled water to saturation and on standing crystalline Netropsin hydrochloride separated as fine needles. Recrystallization was readily accomplished from water. The crystalline Netropsin hydrochloride assayed at 550 Streptomycin units/mg. and 1200 CDU/mg.

In the foregoing examples it is understood that the compositions of a culture media are merely illustrative and can be varied as, for example, by substituting cottonseed meal or soybean meal for wheat gluten, etc.

Likewise the conditions of fermentation such as agitation, aeration rate, temperature, etc. can be varied in many ways at once suggested to one skilled in the art. Many alternative methods and variations of the described methods of recovering the antibiotic such as, for instance, solvent extraction at various pH's, adsorption on activated alumina or charcoal and elution with acid or neutral solvents will likewise be considered within the scope of this invention.

Modifications may be made in carrying out this present invention without departing from the spirit and scope thereof and the invention is only to be limited by the appended claims.

We claim:

1. A process for producing Netropsin, which comprises growing Streptomyces netropsis in an aqueous nutrient culture medium under submerged aerobic conditions until a substantial antibiotic activity is imparted thereto, separating the mycelium therefrom, and recovering the so-produced Netropsin, from the clear broth.

2. A process for producing Netropsin, which comprises growing a strain of Streptomyces netropsis in an aqueous nutrient culture medium and maintaining the said culture medium under submerged aerobic growth conditions at a temperature of about 25° C. to about 30° C. for a period of several days to a week under pure culture conditions, separating the mycelium therefrom, and recovering the so-produced antibiotic, Netropsin, from the clear broth.

3. A process for producing a Netropsin fermentation broth, which comprises cultivating a strain of Streptomyces netropsis in an aqueous nutrient culture medium under aerobic conditions, until substantial antibacterial activity is imparted to said solution.

4. A process as claimed in claim 1, wherein the recovery of the Netropsin includes the step of precipitating the antibiotic by the addition of an arylazo sulfonic acid dyestuff to the clear broth.

5. A substance effective in inhibiting the growth of Gram-negative bacteria, selected from the group consisting of a base capable of forming salts with acids, whose anhydrous hydrochloride is hygroscopic, shows no optical activity in water, methanol or dimethylformamide solutions, has the following elementary analysis:

| | Per cent |
|---|---|
| C | 42.9 |
| H | 5.78 |
| N | 28.1 |
| Cl (ionic) | 13.7 |
| Cl (total) | 13.7 | and in a mineral oil suspension exhibits characteristic absorption in the infrared region of the spectrum at the following frequencies expressed in reciprocal centimeters: 3525, 3300, 3170, 1703, 1670, 1583, 1518, 1300, 1244, 1211, 1149, 1104, 1068, 1060, 1031, 1021, 993, 967, 898, 852, 835, 818, 798, 778, 751, 734, 679, and whose hydrated sulfate is sparingly soluble in water and substantially insoluble in the common organic solvents, and in a mineral oil suspension exhibits characteristic absorption in the infrared region of the spectrum at approximately the following wave lengths: 3290, 1660, 1630, 1580, 1400, 1285, 1260, 1210, 1145, 1100, 1050, 990, 960, 890, 850, 830 and 805 cm.$^{-1}$, and the acid salts of said base.

6. A hydrochloride of the base defined in claim 5.

7. The base defined in claim 5.

8. A sulfate of the base defined in claim 5.

ALEXANDER C. FINLAY.
BEN A. SOBIN.

REFERENCES CITED

The following references are of record in the file of this patent:

UNITED STATES PATENTS

| Number | Name | Date |
|---|---|---|
| 2,422,230 | Foster et al. | June 17, 1947 |
| 2,449,866 | Waksman et al. | Sept. 21, 1948 |
| 2,461,922 | Rake et al. | Feb. 15, 1949 |
| 2,462,175 | Folkers | Feb. 22, 1949 |
| 2,482,055 | Duggar | Sept. 13, 1949 |

OTHER REFERENCES

Waksman and Lechevalier: Science, March 25, 1949, vol. 109, No. 2380, pages 305–307. (Copy in Scientific Library.)

Rivett: On Streptolin, in J. Am. Chem. Soc., vol. 69, December 1947, pages 3006–3009. 167-65.03. (Copy in Patent Office Library.)